United States Patent [19]
Woodman et al.

[11] 4,153,753
[45] May 8, 1979

[54] SPECTRALLY SELECTIVE SURFACES AND METHOD OF FABRICATING THE SAME

[75] Inventors: Trevor P. Woodman, Im Breiteli 1, 8117 Fällanden; Albert Fischer, Grossbuch 14, 8964 Rudolfstetten, both of Switzerland

[73] Assignees: Trevor P. Woodman, Fällanden; Albert Fischer, Rudolfstetten, both of Switzerland

[21] Appl. No.: 822,897

[22] Filed: Aug. 8, 1977

[30] Foreign Application Priority Data

Aug. 20, 1976 [CH] Switzerland .................. 1059676

[51] Int. Cl.² .................. F24J 3/02; B32B 31/20; B32B 15/16
[52] U.S. Cl. .................. 428/409; 126/270; 156/297; 156/306; 156/312; 427/190; 427/194; 427/369; 428/472; 428/484; 428/539; 428/913; 428/918
[58] Field of Search .............. 428/409, 913, 918, 469, 428/472, 539, 484, 523; 427/190, 194, 369; 156/312, 297, 306; 126/270

[56] References Cited

U.S. PATENT DOCUMENTS

| | | | |
|---|---|---|---|
| 2,212,091 | 8/1940 | Wenton | 428/484 X |
| 2,762,724 | 9/1956 | Brennan | 428/472 X |
| 2,865,787 | 12/1956 | Risch | 428/409 X |
| 2,961,341 | 11/1960 | Long | 428/539 X |
| 3,087,832 | 4/1963 | Fogle | 428/539 X |
| 3,102,044 | 8/1963 | Joseph | 427/190 |
| 3,450,585 | 6/1969 | Tagaki et al. | 427/194 |
| 4,045,607 | 8/1977 | Swearingen | 428/484 X |
| 4,061,830 | 12/1977 | Greenberg | 428/469 |
| 4,064,311 | 12/1977 | McLean et al. | 428/472 X |
| 4,065,626 | 12/1977 | Franz | 428/469 X |
| 4,091,145 | 5/1978 | Endo et al. | 428/469 X |

*Primary Examiner*—Harold Ansher
*Attorney, Agent, or Firm*—Werner W. Kleeman

[57] ABSTRACT

The invention comprises spectrally selective surfaces having a good performance at relatively low cost, and designed to be used mainly, but not exclusively, in solar thermal energy collectors. Suitable substances in powder form are attached by simple and effective means to a suitable surface. This is accomplished by the use of new classes of binders, or alternatively, by novel, purely mechanical means, without the use of a binder. The binders described herein feature a high transparency for the infrared radiation emitted by the hot underlying surface, coupled with good adhesive properties towards both the powder and the surface to be coated. The method of effecting the adhesion of a powder layer to the underlying surface without the use of a binder consists of bringing the powder layer into intimate contact with the surface, for example by pressing or rolling the powder layer onto or into the surface, especially with simultaneous mechanical deformation of the object whose surface is being coated.

26 Claims, 3 Drawing Figures

SPECTRALLY SELECTIVE SURFACES AND METHOD OF FABRICATING THE SAME

BACKGROUND OF THE INVENTION

1. Field of the Invention

The present invention relates to relatively low cost optical coatings which are applied to suitable surfaces to give these surfaces spectrally selective properties. A major application of such selective surfaces is as absorber surfaces in solar thermal energy collectors, but they are also applicable, for example, to devices required to emit radiation in selected wavelength bands.

2. Description of the prior art

The use of selective absorber surfaces in solar collectors for the purpose of absorbing as much solar radiation as possible, while re-radiating considerably less energy than a normal black surface, dates from the year 1955. Usable selective surfaces have been produced up to now mainly by chemical and electrochemical processes, but also by vacuum deposition or by deposition from the gas or vapour phases. Disadvantages common to all these processes are the large investment in equipment necessary and in many cases the difficulty of obtaining a uniform layer thickness over large areas. With the chemical and electrochemical methods there is the additional problem of effluent treatment to avoid water pollution; with the other methods there are problems connected with air-locks, gas mixing and temperature control. There have been attempts to develop paints, based on pigments and binders, to be applied to metal surfaces. Up to the present time, the emissivity of such painted surfaces has been too high to be of practical use, mainly because the transparency of the available binders for the emitted heat radiation was too low, but also because of incorrect choice of the pigments, their particle size, and the coating thickness.

Despite this past lack of success, the use of substances in powder form for selective surfaces remains highly advantageous, mainly on account of the relative simplicity of fabrication and the relatively low cost. The present invention features new classes of binders and a method of attaching powder layers to metal surfaces without the use of a binder. By these means, and with the correct choice of absorbing powder or pigment, surfaces having the absorptivity for solar radiation of a normal black surface but having less than one third of the emissivity of the latter, can be fabricated easily and reproducibly.

The heat losses from a flat plate collector using such selective surfaces are reduced typically by 25 to 30%, compared to a normal black surface. This advantage can be used in several ways, such as by reducing the collector area required for an installation or by using one cover glass where two covers were previously used to give the same performance. The small extra cost of selective surfaces according to this invention, as compared to normal black surfaces, is far outweighted by the resulting savings. This has not been the case with the previously available selective surfaces, which cost many times as much as the surfaces according to this invention.

SUMMARY OF THE INVENTION

The invention provides spectrally selective surfaces having a good performance at relatively low cost. The invention features a layer of suitable substances in powder form which is made to adhere to a given surface by the use of specially chosen binders, or alternatively without the use of a binder. An essential feature of this assembly is that the optical properties of the substance, the binder and the underlying surface are chosen to give a selective surface having the desired properties.

The binders according to this invention feature a high transparency for the infrared radiation emitted by the hot underlying surface, coupled with good adhesive properties towards both the powder and the surface to be coated.

The method, according to this invention, of effecting the adhesion of the powder layer to the underlying surface without the use of a binder consists of bringing the powder layer into intimate contact with the surface, such as by pressing or rolling the powder layer onto or into the surface, especially with simultaneous mechanical deformation of the object whose surface is being coated, for example a metal sheet.

Such selective surfaces are designed to be used mainly, but not exclusively, as the absorber surfaces in solar thermal energy collectors, particularly in flat plate collectors. In this application, the requirements are a high absorptivity for solar radiation, coupled with a low emissivity for heat radiation. These requirements are met, as with conventional, mainly chemically and electrochemically produced selective surfaces, by coating a low-emissivity metal surface with a substance which is absorbent for solar radiation but largely transparent for the infrared radiation emitted from the hot metal surface.

Accordingly, it is an object of the invention to provide spectrally selective surfaces having a good performance at relatively low cost, especially for use as absorber surfaces in solar collectors.

It is a particular object of the invention to provide spectrally selective surfaces formed by the adhesion of a layer of a substance or substances in powder form to an underlying surface, whereby the adhesion is accomplished either through the use of binders or, alternatively, by purely mechanical means without the use of a binder.

A further object of the invention is to provide the binders and the mechanical means to accomplish the adhesion of the powder layer to the underlying surface, in order to produce the abovementioned selective surfaces.

BRIEF DESCRIPTION OF THE DRAWINGS

The invention will be better understood and objects other than those set forth above, will become apparent when consideration is given to the following detailed description thereof. Such description makes reference to the annexed drawings wherein.

DESCRIPTION OF THE PREFERRED EMBODIMENTS

A first embodiment of the present invention is a selective surface suitable for the absorber surface of a solar collector. Substances in powder form, i.e. pigments, which have a high absorbance for solar radiation, but a high transparency for emitted heat radiation at typical solar collector temperatures, for example, the oxides of copper, cobalt, nickel or iron, or mixtures of these substances, are made to adhere to low-emissivity metal surfaces, such as clean, bright surfaces of aluminium or copper by means of binders which are largely transparent for the emitted heat radiation. The low emissivity of the original metal surface is not greatly affected by the coating, since both the binder and the pigments are largely transparent to the emitted radiation. On the other hand, the coated surface is absorbent for solar radiation because the pigments absorb in this spectral range.

The preferred binders for this application are liquid or solid paraffins, or various forms of polyethylene, or mixtures of these substances. In addition to exhibiting the required optical properties, these binders also show excellent adhesion and flexibility, so that the coatings cannot peel off due to differential thermal expansion between the coating and the metal, an important factor with solar collectors.

The outstanding advantages of this embodiment of the invention are the low investment in equipment, suitability for all scales of production from individual handwork up to industrial production, the low material costs and absence of wastage, the relatively high speed of fabrication, the fact that continuous coating is possible, and the wide choice of combinations of pigment/metal surface possible, since the substance which absorbs the solar radiation does not itself need to adhere to the metal surface, in contrast to previous, mainly chemical and electrochemical processes. The pigments can thus be chosen from a wide range of well-defined, chemically and physically stable, relatively low-cost products from the chemical industry. Additionally, fabrication of the present selective surfaces can employ existing techniques such as paint-rolling, brushing, spraying or powder coating, thus facilitating the introduction of these surfaces, and minimising the investment in the new equipment.

A further important advantage of this embodiment is that the absorptivity of these selective surfaces for solar radiation can be increased by suitable choice of pigment particle size, in that multiple scattering of solar radiation between the particles can reduce the reflectivity of the surface. Another advantage in practice is that selective surfaces of this type can be easily repaired, should they become damaged.

Figure 1:
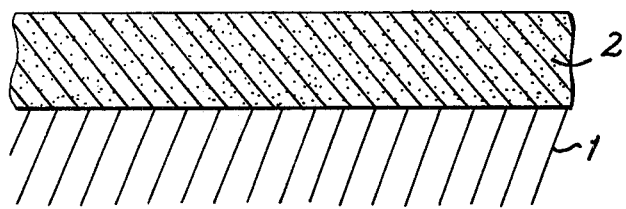
FIG. 1 is an enlarged cross-section of an embodiment of the invention, in which a mixture of pigment and binder has been spread evenly over the surface of the substrate.

Now in FIG. 1 there is shown on an enlarged cross-section an embodiment of the invention, in which a mixture 2 of pigment and binder has been spread evenly over the surface of the substrate 1.

Figure 2:
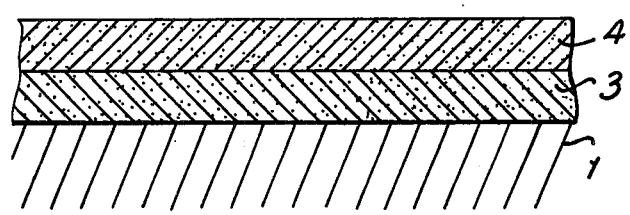
FIG. 2 is an enlarged cross-section of an embodiment of the invention, not to scale, in which a layer of binder has first been attached to the substrate, and subsequently pigment has been spread over the sticky surface of the binder, where it remains adhered in a layer.

FIG. 2 is an enlarged cross-section of an embodiment of the invention, not to scale, in which a layer of binder 3 has first been attached to the substrate 1, and subsequently pigment has been spread over the sticky surface of the binder, where it remains adhered in a layer 4.

Examples of processes for the fabrication of this first embodiment will now be given.

EXAMPLE 1

The metal plate or substrate to be coated is of commercially pure aluminium sheet, 1 mm thick. The pigment is cupric oxide, CuO, with an average particle size of 0.1 $\mu$m, and the binder is pure medicinal liquid paraffin, such as the commercially available trademarked product known as "Nujol". The aluminium plate is roughened uniformly with steel wool, soap and water, rinsed and dried. A mixture of 3 grams of CuO and 7 grams of liquid paraffin per square meter of surface is applied evenly to the aluminium plate, using a rubber roller with a smooth surface. The selective surface is then ready for use.

EXAMPLE 2

The process is identical to that described in Example 1, except that the prescribed quantity of mixture per square meter of surface is further mixed with a suitable quantity of cellulose thinners, and the resultant mixture is applied uniformly to the prepared metal surface, either by brushing or with a spray gun. For these methods of coating it is advisable to use as small a pigment particle size as possible to minimise settling-out of the pigment from the mixture and blockage of the spray gun. The selective surface is usable as soon as the thinners have evaporated. This process is of advantage for the coating of surfaces which are not completely flat, in which case application by a roller, as in Example 1, may become difficult.

EXAMPLE 3

The materials are as for Example 1, except that the binder is a low density polyethylene foil, 25 $\mu$m thick. This foil is placed on the prepared aluminium surface, and both are heated to at least 120° C., e.g. on a hotplate, whereupon the foil melts and adheres to the aluminium surface. The pigment is then shaken over the sticky surface until complete coverage is obtained, superfluous pigment being removed with a brush. Upon cooling, a solid surface results. It would be of advantage to use a thinner foil, where available, since the infrared transparency increases with decreasing foil thickness.

A second embodiment of the present invention is also a selective surface suitable for the absorber surface of a solar collector. The same substances in powder form, i.e. pigments, as listed in the description of the first embodiment, or mixtures thereof, are formed into a uniform layer, and subsequently brought into intimate contact with a low-emissivity surface, such as a clean, bright surface of aluminium or copper, for example by pressing or rolling the powder layer onto or into the surface, especially with simultaneous mechanical deformation of the metal or substrate being coated. The low emissivity of the original metal surface is not greatly affected by the coating, since the pigment layer is largely transparent to the emitted radiation. On the other hand, the coated surface is absorbent for solar radiation because the pigment absorbs in this spectral range.

The outstanding advantage of this embodiment of the invention is that the adhesion of the pigment to the metal surface is accomplished without the use of a binder. This has two main consequences: firstly, that the operating temperature of the selective surface is not limited by the thermal stability of the binder; and secondly, that potentially lower emissivities of the selective surface are achievable, since no binder material is ideally transparent to the emitted heat radiation: a binder thus always increases the emissivity of the metal surface to some extent.

Further advantages of this embodiment of the invention are the low material costs, the relatively high speed of the process, the fact that an existing plant, such as a rolling mill can be used, the wide choice of combinations of pigment/metal surface possible, in contrast to previous, mainly chemical and electrochemical processes, and the fact that continuous coating of a metal band is possible.

Another important advantage of this embodiment is the excellent adhesion of the coatings, owing to the intimate contact of the pigment layer with the metal surface, which results in a high peeling resistance of the coating when subjected to differential thermal expansion or to further mechanical forming, such as may be necessary in the fabrication of an absorber plate for a solar collector.

A further important advantage of this embodiment is that the fabrication of the selective surface can be integrated into the ROLL-BOND process for the production of absorber plates for solar collectors, either by the use of the same rolling mill for both processes, or by running the two processes simultaneously; additionally, such selective surfaces could be produced on several plates at the same time.

Figure 3:
FIG. 3 is an enlarged cross-section of an embodiment of the invention, in which a layer of pigment has been pressed onto or into the surface of the substrate.

Now in FIG. 3 there is shown on an enlarged cross-section an embodiment of the invention, in which a layer of pigment 5 has been pressed onto or into the surface of the substrate 1.

Examples of processes for the fabrication of this second embodiment will now be given.

EXAMPLE 4

The metal plate is commercially pure aluminium sheet, 2 mm thick. The pigment is black iron oxide, $Fe_3O_4$, having an average particle size of 0.1 $\mu$m. The aluminum surface is prepared as in Example 1. A thin layer of pigment is first assembled on a band of tempered steel 0.05 mm thick, which has been cleaned with acetone. This is accomplished by first spreading highly thinned "Rubber Cement" over one surface of the steel band by means of a saturated pad of cotton wool. The pigment is then spread over the sticky surface for complete coverage, superfluous pigment being shaken or brushed off. The coated steel band is then laid on the aluminium plate with the pigment layer facing the prepared aluminium surface, whereupon both sheets are passed through a rolling mill. The rolling process is repeated once or twice, using a newly coated steel band each time, until a uniformly dark coating is obtained on the aluminium. The final coating thickness is typically about 0.5 $\mu$m, and the overall reduction in the aluminium thickness is typically about 25%.

EXAMPLE 5

Two aluminium plates, 2 mm thick, are each cleaned and roughened on one face, as in Example 1. A suspension is made in isopropanol of the pigment used in Example 4, and painted uniformly onto each prepared aluminium surface. The two aluminium plates are then riveted together with the coated faces facing each other, and passed together through a rolling mill. After separation, the plates are ready for fabrication into absorber plates for solar collectors. The reduction on rolling can be chosen within wide limits to suit the production process and the original pigment thickness which can be conveniently attained by painting. A minimal reduction of approximately 10% is reasonable. A final pigment thickness of about 0.5 $\mu$m is reasonable for black iron oxide as used in this example.

With reference to the first embodiment it should be stated that the optimal particle size for the pigments depends on their refractive index, the refractive index of the binder and the degree of immersion of the particles in the binder, inter alia. The optimal particle size must therefore be determined experimentally in each case. The thickness of the binder should be kept to a minimum, consistent with good adhesion properties.

With reference to the second embodiment, the optimal particle size of the pigment must also be determined experimentally in each case.

In the case of both embodiments of this invention the optimal pigment thickness, i.e. the total volume of pigment per unit area, depends upon the relative values of the absorbance of the pigment for the solar radiation and for the infrared emitted radiation, and upon the absorptivity-emissivity values desired for the surface.

Further, in the case of both embodiments, it is possible to use coloured pigments instead of black pigments. This is of advantage in improving the outward appearance of solar collectors, especially when large areas are involved. By this means some measure of adaptation to the landscape or the urban scene is possible, which in some locations might be a deciding factor for planning permission. The loss of performance on account of the lower absorptivity of a coloured coating is acceptable with selective coatings because it is compensated for by the low emissivity of the surface. Thus, the performance of a normal black surface can still be attained, with the advantages of a coloured surface.

The invention may be practiced other than as specifically detailed herein without departing from the scope of the invention as defined by the following claims.

What we claim is:

1. A body with spectrally selective surface possessing the absorptivity for solar radiation of a correspondingly colored non-selective surface but having a significantly lower emissivity for heat radiation than said non-selective surface, comprising an outer layer comprising at least one metal oxide pigment in powder form selected from the group consisting essentially of oxides of copper, cobalt, iron or mixtures thereof, a supporting substrate having a poorly emitting metal surface selected from the group consisting essentially of copper or aluminum, said outer metal oxide powder layer being mechanically attached to the poorly emitting metal surface of the supporting substrate directly or by means of a binder which is largely transparent to heat radiation emitted from the underlying metal surface, said outer layer possessing a high absorptivity for solar radiation, while being largely transparent to the heat radiation emitted by the surface of the substrate.

2. The body according to claim 1, wherein the pigment layer is brought into intimate contact with the surface of the substrate by pressing such pigment layer onto or into the surface of the substrate without a binder.

3. The body according to claim 1, wherein the metal oxides are selected from the group consisting essentially of oxides of copper, cobalt, iron or nickel, or mixtures thereof.

4. The body according to claim 1, wherein the pigments comprise colored pigments.

5. The body according to claim 1, wherein the metal substrate is bright copper.

6. The body according to claim 1, wherein the metal substrate is bright aluminium.

7. The body according to claim 1, wherein the metal substrate comprises polished copper.

8. The body according to claim 1, wherein the metal substrate comprises polished aluminium.

9. The body as defined in claim 1, wherein said body is employed as the absorber in a solar collector.

10. The body as defined in claim 1, further including a binder which is also largely transparent to the emitted radiation for attaching the pigment layer to the substrate, said binder being selected from the group consisting essentially of paraffin, polyethylene or mixtures thereof.

11. The body according to claim 10, wherein the binder consists of at least one liquid paraffin.

12. The body according to claim 10, wherein the binder comprises at least one solid paraffin.

13. The body according to claim 10, wherein the binder is polyethylene.

14. A process for the fabrication of a body with a spectrally selective surface, comprising the steps of:
providing a substrate having a metal surface selected from the group consisting essentially of copper or aluminum which is to accept a pigment layer;
mechanically attaching an outer layer comprising at least one metal oxide pigment in powder form selected from the group consisting essentially of oxides of copper, cobalt, iron or mixtures thereof to the surface of the substrate; and wherein,
the outer layer possesses a high absorptivity for solar radiation, while being larely transparent to the heat radiation emitted by the surface of the substrate.

15. The process as defined in claim 14, further including the steps of:
first cleaning the surface which is to accept the pigment layer of any contamination which would raise the emissivity of the surface prior to mechanically attaching the pigment layer to such surface.

16. The process as defined in claim 14, further including the steps of:
applying an outer layer containing a mixture of the pigment and a binder substantially evenly to the surface of the substrate.

17. The process according to claim 14, further including the steps of:
mechanically deforming the substrate during the coating process.

18. The process as defined in claim 17, wherein:
mechanical deformation of the substrate is accomplished by passing the substrate through a rolling mill.

19. The process as defined in claim 14, further including the steps of:
applying at least one binder to the surface of the substrate to form a sticky surface; and
thereafter distributing the pigment over the sticky surface.

20. The process as defined in claim 19, further including the step of:
heating the binder and the surface of the substrate prior to distribution of the pigment.

21. The process according to claim 14, further including the steps of:
bringing the pigment into contact with the surface of the substrate and pressing such pigment onto or into such surface.

22. The process according to claim 21, wherein:
the pressing sttep is carried out by the use of a rolling mill.

23. The process according to claim 21, further including the steps of:
first assembling the pigment layer onto a die by means of an adhesive; and
then pressing the pigment layer onto or into the surface of the substrate by means of the die.

24. The process according to claim 23, further including the steps of:
using as the adhesive rubber cement.

25. The process according to claim 21, further including the steps of:
forming a suspension of the pigment in a volatile liquid;
providing two substrates having clean surfaces;
evenly coating the clean surfaces of the two substrates with the suspension;
evaporating the liquid of the suspension;
after evaporation of the liquid fixing together the two substrates with the coated faces in contact with each other;
pressing together the two substrates; and
subsequently separating the substrate from one another.

26. The process according to claim 25, further including the steps of:
pressing together the two substrates by a rolling mill.

* * * * *